(12) United States Patent
Ishikawa et al.

(10) Patent No.: US 8,003,181 B2
(45) Date of Patent: Aug. 23, 2011

(54) ANTICORROSION SLEEVE

(75) Inventors: Kazuo Ishikawa, Osaka (JP); Yuji Tsuda, Osaka (JP)

(73) Assignee: Tabuchi Co., Ltd. (JP)

( * ) Notice: Subject to any disclaimer, the term of this patent is extended or adjusted under 35 U.S.C. 154(b) by 460 days.

(21) Appl. No.: 11/169,485

(22) Filed: Jun. 29, 2005

(65) Prior Publication Data
US 2005/0287327 A1 Dec. 29, 2005

(30) Foreign Application Priority Data
Jun. 29, 2004 (JP) ................. 2004-191870

(51) Int. Cl.
*B29D 23/00* (2006.01)
*F16L 9/18* (2006.01)
*F16L 39/00* (2006.01)

(52) U.S. Cl. ............... 428/36.91; 138/155; 428/36.9; 285/332

(58) Field of Classification Search ............ 285/15, 285/16, 17, 24, 100, 101, 197, 222, 334.5, 285/332, 382, 382.4, 239, 258, 31, 113, 325, 285/397, 921, 422, 423, 285.1, 294.1, 55; 138/109, 143, 146, 155; 428/36.9; 156/294, 156/423
See application file for complete search history.

(56) References Cited

U.S. PATENT DOCUMENTS

| | | | | |
|---|---|---|---|---|
| 199,349 A | * | 1/1878 | Caswell | 138/39 |
| 228,161 A | * | 6/1880 | Adlam, Jr. | 285/258 |
| 330,873 A | * | 11/1885 | Cobb | 285/55 |
| 628,005 A | * | 7/1899 | Histed et al. | 285/345 |
| 928,237 A | * | 7/1909 | Baird | 285/239 |
| 1,576,874 A | * | 3/1926 | Stevens | 264/249 |
| 2,918,314 A | * | 12/1959 | Kemnitz | 285/239 |
| 3,434,746 A | * | 3/1969 | Watts | 285/140.1 |
| 3,656,783 A | * | 4/1972 | Reeder | 285/239 |
| 3,677,578 A | * | 7/1972 | Roos | 285/140.1 |
| 3,732,734 A | * | 5/1973 | Avakian | 73/864.14 |
| 3,830,531 A | * | 8/1974 | Burge | 285/239 |
| 3,879,069 A | * | 4/1975 | Oostenbrink | 285/140.1 |
| 3,948,546 A | * | 4/1976 | Welsby et al. | 285/239 |
| 3,967,840 A | * | 7/1976 | McFall | 285/222 |
| 3,982,778 A | * | 9/1976 | Spencer et al. | 285/222 |
| 4,072,330 A | * | 2/1978 | Brysch | 73/864.14 |
| 4,122,870 A | * | 10/1978 | Hines | 138/109 |
| 4,556,240 A | * | 12/1985 | Yoshida | 285/55 |
| 4,600,222 A | * | 7/1986 | Appling | 285/288.1 |

(Continued)

FOREIGN PATENT DOCUMENTS

JP 7-23892 5/1995
(Continued)

*Primary Examiner* — Rena Dye
*Assistant Examiner* — Michele Jacobson
(74) *Attorney, Agent, or Firm* — Thompson Hine LLP

(57) ABSTRACT

An anticorrosion sleeve including a resin sleeve and a metal sleeve tightly received in the resin sleeve. The metal sleeve has a gradually expanding outer diameter thereof toward one circular edge thereof in a tapered shape in cross section so that the metal sleeve expands the resin sleeve in diameter when the metal sleeve is inserted into the resin sleeve. The resin sleeve includes a large-diameter portion and a small-diameter portion. The metal sleeve includes an engagement end portion, an intermediate portion, and a tapered end portion in that order. The outer circumference of the engagement end portion of the metal sleeve is engaged beforehand with a step between the inner circumferences of the large-diameter portion and the small-diameter portion of the resin sleeve.

15 Claims, 4 Drawing Sheets

U.S. PATENT DOCUMENTS

| | | | | |
|---|---|---|---|---|
| 4,773,452 A * | 9/1988 | Dotti et al. | | 138/109 |
| 4,804,207 A * | 2/1989 | Berchem et al. | | 285/16 |
| 5,050,912 A * | 9/1991 | Hayasaka | | 285/222 |
| 5,244,236 A * | 9/1993 | Ninomiya | | 285/39 |
| 5,279,124 A * | 1/1994 | Aymond | | 60/533 |
| 5,330,236 A * | 7/1994 | Peterjohn et al. | | 285/222.2 |
| 5,486,023 A * | 1/1996 | Sanders et al. | | 285/258 |
| 5,526,846 A * | 6/1996 | Maloberti | | 138/109 |
| 5,921,591 A * | 7/1999 | Argent | | 285/330 |
| 5,954,371 A * | 9/1999 | Koke et al. | | 285/55 |
| 6,016,843 A * | 1/2000 | Wada et al. | | 138/109 |
| 6,113,156 A * | 9/2000 | Bea | | 285/140.1 |
| 6,217,082 B1 * | 4/2001 | Orcutt et al. | | 285/272 |
| 6,328,351 B1 * | 12/2001 | Kato et al. | | 285/368 |
| 6,405,761 B1 * | 6/2002 | Shimizu et al. | | 138/109 |
| 6,405,762 B1 * | 6/2002 | Bunch | | 138/109 |
| 6,561,550 B1 * | 5/2003 | Kiraz | | 285/259 |
| 6,588,805 B2 * | 7/2003 | Persohn et al. | | 285/305 |
| 7,390,029 B2 * | 6/2008 | Matsubara | | 285/321 |
| 2003/0080557 A1 * | 5/2003 | Benavides et al. | | 285/239 |
| 2003/0146621 A1 * | 8/2003 | Park et al. | | 285/239 |
| 2003/0230894 A1 * | 12/2003 | Cleveland et al. | | 285/239 |
| 2004/0118470 A1 * | 6/2004 | Furuta | | 138/139 |
| 2005/0093298 A1 * | 5/2005 | Takayanagi | | 285/319 |
| 2006/0202473 A1 * | 9/2006 | Dallai | | 285/239 |

FOREIGN PATENT DOCUMENTS

| | | | |
|---|---|---|---|
| JP | 2001-304487 | | 10/2001 |
| JP | 2001304487 A | * | 10/2001 |
| JP | 2004162824 A | * | 6/2004 |

* cited by examiner

ANTICORROSION SLEEVE

BACKGROUND OF THE INVENTION

1. Field of the Invention

The present invention relates to an anticorrosion sleeve that prevents an exposed portion of a metal pipe in water mains from corroding when an opening is drilled in the metal pipe.

2. Description of the Related Art

When a branch pipe is connected to a water main pipe in a conventional method, an opening is drilled in the water main pipe and a sleeve is fitted to the opening to prevent corrosion on the wall of the opening. Since the sleeve is typically metallic, a rust deposit is caused if gaps take place between the metal sleeve and the sleeve passage or between the metal sleeve and the wall of the opening of the main water pipe. A water-tight sleeve made of rubber is also known. If the rubber sleeve is forced into the opening too strongly, the rubber may be buckled, and water may be leaked. The opening of the pipe is typically not smooth and can have a sharp edge. When engaged with such a sharp edge, the rubber sleeve is likely to be cut and no sufficient anticorrosion effect is expected.

The inventors of this invention disclose a dual-structured anticorrosion sleeve having a hybrid sleeve with a resin and a metal in Japanese Utility Model Open Gazette No. 7-23892 and Japanese Patent Open Gazette No. 2001-304487.

In accordance with Japanese Utility Model Open Gazette No. 7-23892, the metal sleeve provides rigidity while the resin sleeve provides tightness. However, the metal sleeve has a complex cross-sectional structure to assure tightness between the resin sleeve and the metal sleeve. This structure leads to an increase in manufacturing cost and a large force must be applied to expand the diameter of the metal sleeve and to pull a diameter expansion device out of the assembly.

An anticorrosion sleeve disclosed in Japanese Patent Open Gazette No. 2001-304487 has been developed to overcome the drawback of the above-referenced sleeve. The disclosed sleeve includes a metal sleeve and a resin sleeve. The metal sleeve includes a step on the outer circumference between a large-diameter portion and a small-diameter portion. In accordance with the structure of the metal sleeve, the resin sleeve includes a step on the inner circumference between a small-diameter portion and a large-diameter portion along the direction of insertion. The step of the metal sleeve is thus engaged with the step of the resin sleeve. With the steps used as a guide, the metal sleeve is inserted into the resin sleeve without using any particular fitting tool. The resin sleeve is expanded in diameter by simply inserting further the metal sleeve and the sleeve is thus mounted. A significant force is required to force the metal sleeve into the resin sleeve to expand the diameter of the resin sleeve. To assure reliable tightness with the opening of the water main pipe, a predetermined criterion in the expansion must be set beforehand. Such a predetermined criterion is not applicable to a large opening and the degree of diameter expansion of the resin sleeve is typically small. Tightness on the large-diameter portion becomes insufficient.

SUMMARY OF THE INVENTION

The present invention relates to improvement of a dual-structured anticorrosion sleeve which enables a resin sleeve to expand with a step when the metal sleeve is pushed. An object of the present invention is to provide a versatile anticorrosion sleeve that assures the ease of push-in operation while achieving a large diameter expansion ratio to assure high tightness.

In accordance with one embodiment of the present invention, an anticorrosion sleeve includes a resin sleeve and a metal sleeve to be tightly received in the resin sleeve. The metal sleeve has a gradually expanding outer diameter thereof toward one circular edge thereof in a tapered shape in cross section so that the metal sleeve expands the resin sleeve in diameter when the metal sleeve is inserted into the resin sleeve. The metal sleeve provides rigidity while the resin sleeve provides tightness with the opening drilled in a water main pipe. With the metal sleeve pushed into the resin sleeve, the tapered end portion expands the resin sleeve in diameter, thereby tightly pressing the resin sleeve against the opening.

The tapered end portion may expand over the entire longitudinal length of the metal sleeve. Alternatively, the resin sleeve may include a large-diameter portion and a small-diameter portion, and the metal sleeve may include an engagement end portion, an intermediate portion and a tapered end portion in that order. The outer circumference of the engagement end portion of the metal sleeve is engaged beforehand with a step between the inner circumferences of the large-diameter portion and the small-diameter portion of the resin sleeve. The intermediate portion of the metal sleeve is passed beforehand through the large-diameter portion to be ready to expand the small-diameter portion of the resin sleeve in diameter. The tapered end portion of the metal sleeve is ready to be tightly engaged with the large-diameter portion in a manner such that the metal sleeve expands the large-diameter portion in diameter. With this arrangement, the metal sleeve is inserted into the resin sleeve until the engagement end portion is engaged with the step, in other words, until the intermediate portion is engaged into the large-diameter portion in a connected state. By further pushing the metal sleeve into the resin sleeve from the connected state, the intermediate portion expands the small-diameter portion of the resin sleeve in diameter while the tapered end portion expands the large-diameter portion of the resin sleeve.

The inner circumference of the large-diameter of the resin sleeve may equal in longitudinal length of the tapered end portion of the metal sleeve.

The resin sleeve may include a thickened part in the large-diameter portion. With the thickened part expanded in diameter, a saddle valve mounted above the opening in a water main pipe provides increased tightness in a water passage.

The metal sleeve may include a projected ring portion on the outer circumference thereof and the resin sleeve may include a circular groove on the inner circumference thereof. The projected ring portion is received in the circular groove in a state that the metal sleeve is inserted into the resin sleeve by a predetermined joint length. With the projected ring portion and the circular groove engaged with each other in the predetermined joint length, the metal sleeve and the resin sleeve are set to be in an inseparable state. Prior to a push-in operation, the sleeve is handled as a unitary product.

In accordance with embodiments of the present invention, the metal sleeve having the tapered end portion gradually expands the resin sleeve as the metal sleeve is inserted into the resin sleeve. The sleeve requiring no sharp push-in force permits a push-in operation to be easily performed. By adjusting a taper angle and the range of taper, the range and the degree of diameter expansion in the resin sleeve can be adjusted.

The resin sleeve has two portions and the metal sleeve has the three portions. The metal sleeve is thus connected to the resin sleeve by a predetermined joint length. If the tapered end portion forces the large-diameter portion to expand in diameter during the push-in operation of the metal sleeve, the intermediate portion also forces the small-diameter portion to expand in diameter. The push-in operation is easy to perform and high tightness is thus achieved. With the large-diameter and the tapered end portion equal to each other in longitudinal length, the push-in operation is performed most conveniently.

Since the thickened part is formed on the outer circumference of the resin sleeve, tightness around water passage is increased even when the water passage of a saddle valve is set to be larger in diameter than the water passage of a ball valve above the opening in the water main pipe.

The metal sleeve includes the projected ring portion on the outer circumference thereof and the resin sleeve includes the circular groove on the inner circumference thereof. The projected ring portion is received in the circular groove in the state that the metal sleeve is connected to the resin sleeve by the predetermined joint length. With the projected ring portion and the circular groove engaged with each other in the predetermined joint length, the metal sleeve and the resin sleeve are set to be in the inseparable state. Prior to the push-in operation, the sleeve is handled as the unitary product.

DESCRIPTION OF THE PREFERRED EMBODIMENTS

Figure 1:
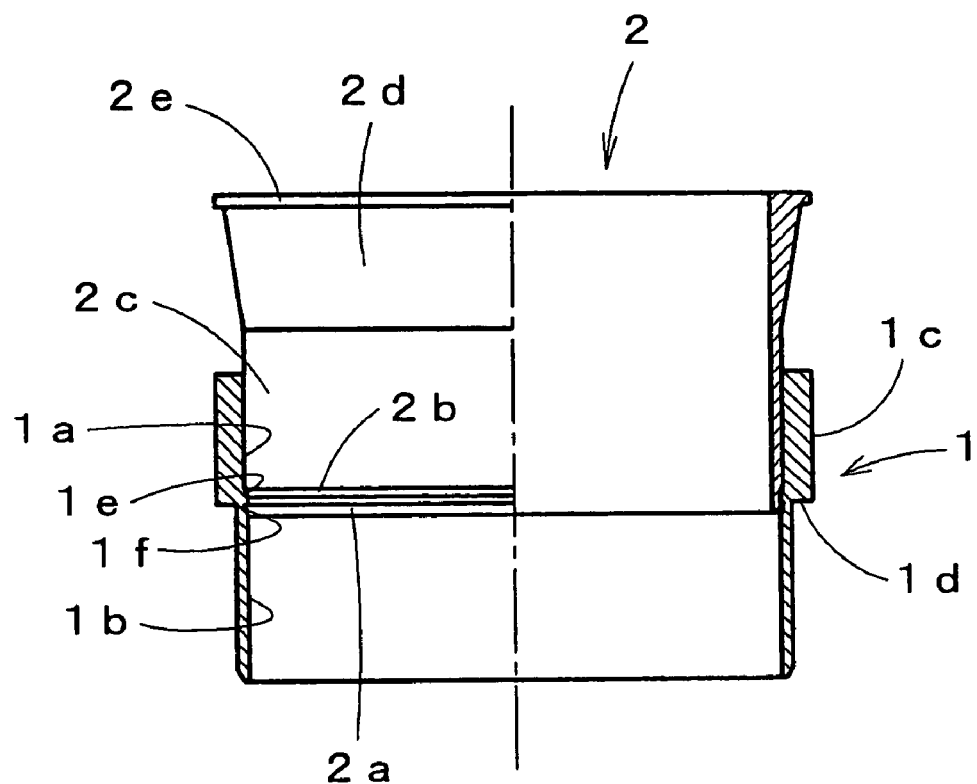
FIG. 1 illustrates an anticorrosion sleeve in the connected state thereof in a partly cross-sectional view in accordance with one embodiment of the present invention.
Figure 2:
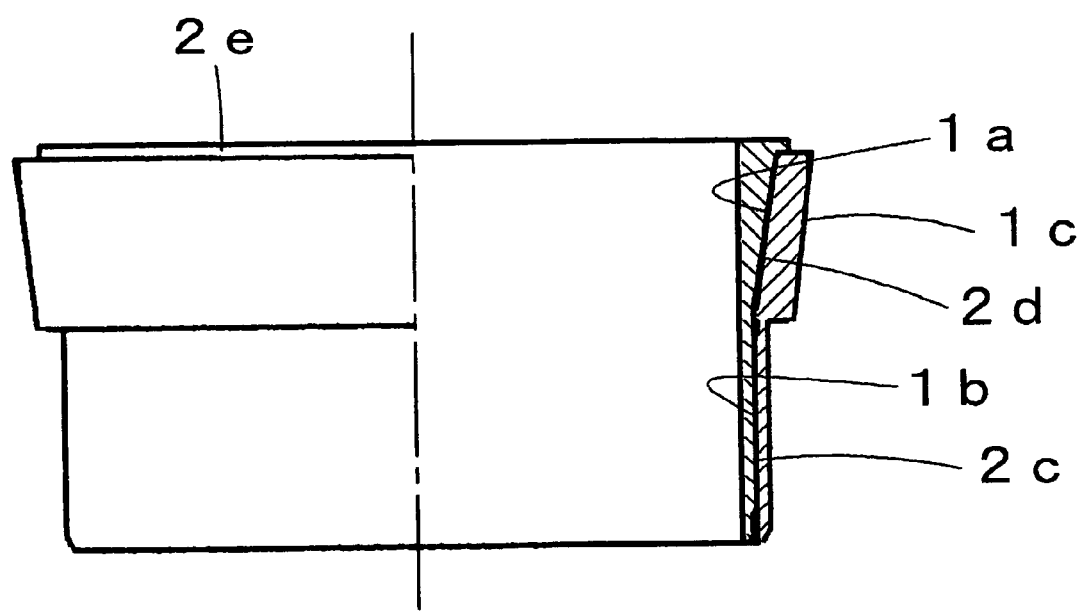
FIG. 2 illustrates the anticorrosion sleeve in the fully engaged state thereof in a partly cross-sectional view in accordance with the embodiment of the present invention.

The embodiment of the present invention is described below with reference to the drawings. FIGS. 1 and 2 are partially cross-sectional views of an anticorrosion sleeve of one embodiment of the present invention. As shown, the anticorrosion sleeve includes a resin sleeve 1 and a metal sleeve 2 to be tightly received in the resin sleeve 1.

The resin sleeve 1 includes two portions, namely, a large-diameter portion 1a and a small-diameter portion 1b on the inner circumference thereof. The resin sleeve 1 also includes on the outer circumference thereof a thickened portion 1c having the same longitudinal length as the large-diameter portion 1a. As a result, the resin sleeve 1 has a step 1e on the inner circumference thereof and a step 1d on the outer circumference thereof. The step 1d caused by the thickened portion 1c functions as an alignment guide when the resin sleeve 1 is inserted into an opening drilled in a water main pipe. A circular groove 1f is arranged on the top part of the resin sleeve 1 on the inner circumference and below the step 1e between the large-diameter portion 1a and the small-diameter portion 1b.

The metal sleeve 2 having a cylindrical inner surface includes, on the lower end of the outer circumference thereof, a projected ring portion 2a that is to be engaged with the circular groove 1f. The metal sleeve 2 includes three portions, namely, a lower engagement end portion 2b to be engaged with the step 1e, an intermediate cylindrical portion 2c, and a tapered end portion 2d. The metal sleeve 2 further includes a flange 2e. The intermediate cylindrical portion 2c is inserted beforehand into the resin sleeve 1 to be engaged with the large-diameter portion 1a. The metal sleeve 2 is connected to the resin sleeve 1 with the projected ring portion 2a engaged with the circular groove 1f. The tapered end portion 2d is tapered so that the diameter of the metal sleeve 2 gradually expands as it goes upward as shown in FIG. 1. In the connected state of the metal sleeve 2, the tapered end portion 2d is exposed from the resin sleeve 1. When pushed into the resin sleeve 1, the tapered end portion 2d expands the large-diameter portion 1a in diameter. In this embodiment, the tapered end portion 2d equals the large-diameter portion 1a (the thickened portion 1c) in longitudinal length.

Figure 3:
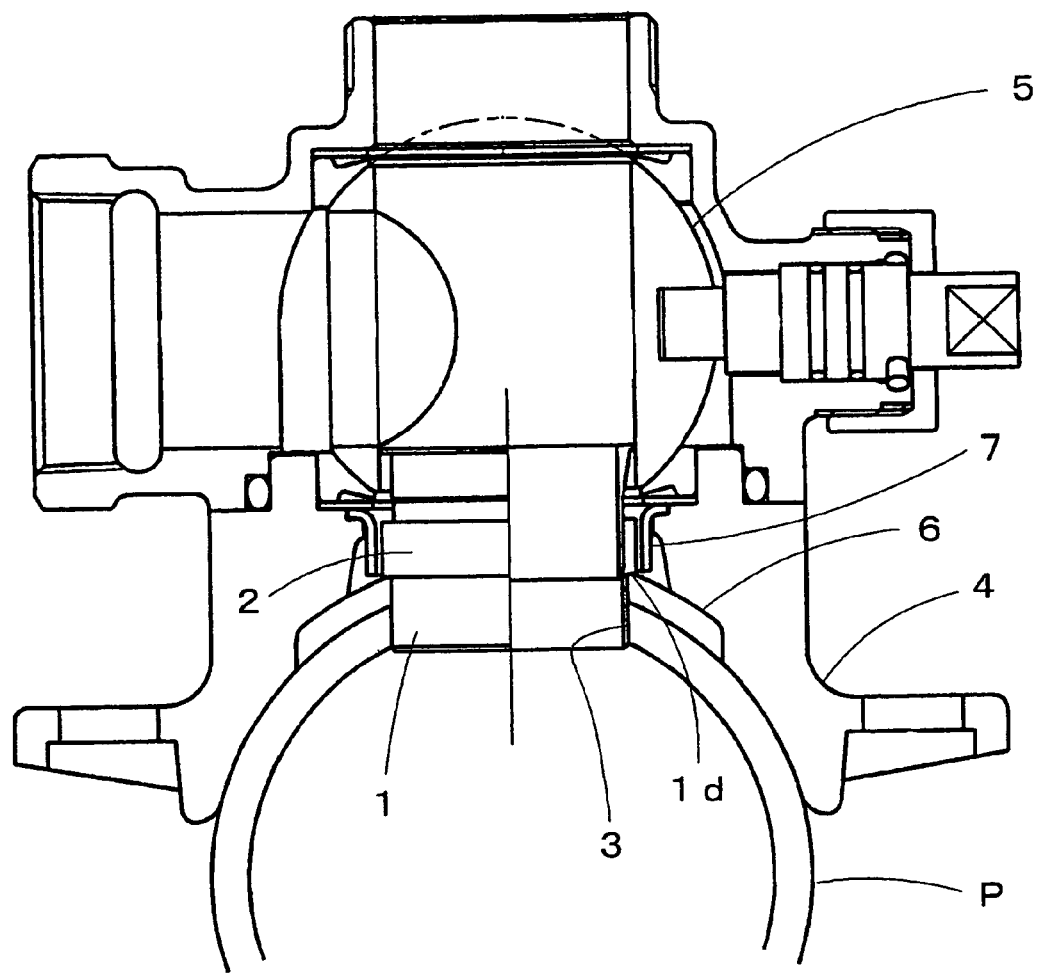
FIG. 3 illustrates the anticorrosion sleeve inserted into an opening of a water main pipe prior to a push-in operation.
Figure 4:
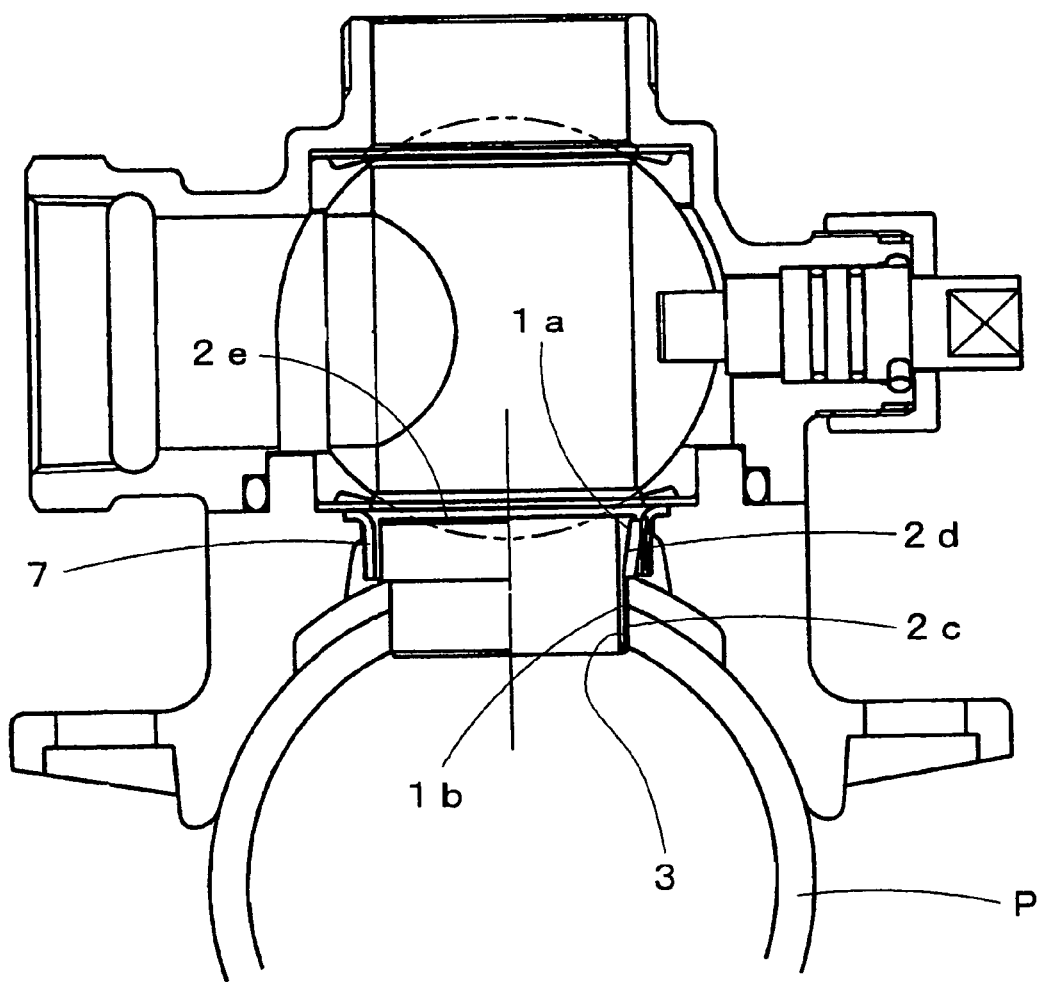
FIG. 4 illustrates the anticorrosion sleeve in the mounted state thereof subsequent to the push-in operation.

FIGS. 3 and 4 illustrate the anticorrosion sleeve mounted in an opening 3 drilled in a water main pipe P. The anticorrosion sleeve with the metal sleeve 2 connected to the resin sleeve 1 is fitted into the opening 3. Using a tool such as a piston, the metal sleeve 2 is further pushed into the resin sleeve 1. FIG. 4 illustrates an installed anticorrosion sleeve.

FIG. 4 shows an upper band 4 of a saddle valve mounted on the water main pipe P, a ball valve 5 mounted on the upper band 4, a doughnut-shaped gasket 6 housed in the upper band 4 and a water passage ring 7 interposed between the gasket 6 and the ball valve 5. The water passage ring 7 has, on the top portion thereof, a radially externally extending flange and has an inner diameter slightly larger than the opening of the ball valve 5.

The anticorrosion sleeve is thus inserted through the opening 3 via the internal passage of the ball valve 5 until the step 1d of the resin sleeve 1 is engaged with the top of the water main pipe P. If the metal sleeve 2 is further pushed in, the intermediate cylindrical portion 2c of the metal sleeve 2 forces the small-diameter portion 1b of the resin sleeve 1 to expand in diameter until the small-diameter portion 1b is tightly engaged with the opening 3. By pushing the metal sleeve 2 until the flange 2e limits further push-in operation, the large-diameter portion 1a of the resin sleeve 1 is expanded in diameter by the tapered end portion 2d of the metal sleeve 2. The large-diameter portion 1a is tightly engaged with the water passage ring 7. The installation of the anticorrosion sleeve is thus completed with the resin sleeve 1 tightly engaged with the opening 3.

The embodiment of the present invention has been discussed for exemplary purposes only. The entire outer circumference of the metal sleeve 2 may be tapered. In that case, it is not required that the inner circumference of the resin sleeve 1 has the two portions. The resin sleeve 1 may be cylindrical in structure.

The material of the resin sleeve 1 needs to be rigid enough to be free from buckling even when the metal sleeve 2 is pushed therewithin. Furthermore, the material of the resin sleeve 1 needs to be elastic enough not to break down when the metal sleeve 2 is pushed therewithin. For example, the resin sleeve 1 is preferably made of hard polypropylene, polyethylene or the like. The metal sleeve 2 is preferably made of stainless steel to maintain anticorrosion property.

What is claimed is:

1. An anticorrosion sleeve comprising:
   a resin sleeve having a large-diameter portion and a small-diameter portion on the inner circumference thereof and a transition therebetween that defines, when viewed in cross-section, a step, the resin sleeve further comprising a circular groove recessed into the inner circumference of the small-diameter portion such that the groove is defined by opposing side walls spaced apart from one another, wherein the circular groove is positioned on an upper end of the small-diameter portion proximate the step; and
   a metal sleeve to be tightly received in the resin sleeve so that the metal sleeve expands the resin sleeve in diameter when the metal sleeve is inserted into the resin sleeve, the metal sleeve comprising an engagement end portion, an intermediate portion, and a tapered end portion having an outer diameter that gradually decreases toward the intermediate portion;

wherein the intermediate portion of the metal sleeve is passed through the large-diameter portion of the resin sleeve to be ready to expand the small-diameter portion of the resin sleeve in diameter before further pushing the metal sleeve into the resin sleeve, and wherein the tapered end portion of the metal sleeve is ready to be tightly engaged with the large-diameter portion in a manner such that the metal sleeve expands the large-diameter portion in diameter; and wherein the metal sleeve comprises a projected ring portion on a lower end of the outer circumference of the engagement end portion;

wherein the metal sleeve is connected to the resin sleeve with the projected ring portion engaged with the circular groove as a partially assembled position with the tapered end portion exposed from the resin sleeve;

wherein the metal sleeve and resin sleeve, connected in the partially assembled position, are insertable into an opening in a pipe.

2. The anticorrosion sleeve according to claim 1, wherein the inner circumference of the large-diameter of the resin sleeve equals in longitudinal length the tapered end portion of the metal sleeve.

3. The anticorrosion sleeve according to claim 1, wherein the resin sleeve comprises a thickened part in the large-diameter portion.

4. The anticorrosion sleeve according to claim 1, wherein the resin sleeve further comprises a step where the large-diameter portion meets the small-diameter portion of the resin sleeve.

5. The anticorrosion sleeve according to claim 4, wherein the step is on the outer circumference of the resin sleeve.

6. The anticorrosion sleeve according to claim 4, wherein the step is on the inner circumference of the resin sleeve.

7. The anticorrosion sleeve of claim 1, wherein the projected ring portion is positioned on the engagement end portion such that the engagement end portion engages the step on the inner circumference of the resin sleeve while the projected ring portion is engaged with the circular groove.

8. An anticorrosion sleeve comprising:

a resin sleeve having a large-diameter portion and a small-diameter portion on the inner circumference thereof and a transition therebetween that defines, when viewed in cross-section, a step, the resin sleeve further comprising a circular groove recessed into the inner circumference of the small-diameter portion such that the groove is defined by opposing side walls spaced apart from one another, wherein the circular groove is positioned on an upper end of the small-diameter portion proximate the step; and a metal sleeve to be tightly received in the resin sleeve so that the metal sleeve expands the resin sleeve in diameter when the metal sleeve is inserted into the resin sleeve, the metal sleeve comprising an engagement end portion, an intermediate portion, and a tapered end portion having an outer diameter that gradually decreases toward the intermediate portion;

wherein the engagement end portion of the metal sleeve comprises a projected ring portion on the outer circumference thereof; and wherein the projected ring portion is received in the circular groove to connect the metal sleeve to the resin sleeve in a partially assembled state with the tapered end portion exposed from the resin sleeve; wherein the metal sleeve and resin sleeve, connected in the partially assembled position, are insertable into an opening in a pipe before the metal sleeve is further pushed into the resin sleeve to expand the resin sleeve in diameter.

9. The anticorrosion sleeve of claim 8, wherein the projected ring portion is positioned on the engagement end portion such that the engagement end portion engages the step on the inner circumference of the resin sleeve while the projected ring portion is engaged with the circular groove.

10. A method comprising:

providing a resin sleeve having a large-diameter portion and a small-diameter portion on its inner circumference thereof and a transition therebetween that defines, when viewed in cross-section, a step, the resin sleeve including a circular groove recessed into the inner circumference of the small-diameter portion such that the groove is defined by opposing side walls spaced apart from one another, wherein the circular groove is positioned on an upper end of the small-diameter portion proximate the step;

providing a metal sleeve that expands the resin sleeve in diameter when the metal sleeve is fully inserted into the resin sleeve, the metal sleeve having a lower engagement end portion and an upper end portion, the metal sleeve having a projected ring on the outer circumference of the lower engagement end portion;

inserting the metal sleeve into the resin sleeve to a partially assembled position where the projected ring of the metal sleeve is received in the circular groove of the resin sleeve with the tapered end portion exposed from the resin sleeve and the metal sleeve is ready to expand the resin sleeve;

inserting the partially assembled metal sleeve and resin sleeve into an opening in a pipe; and expanding the resin sleeve until the small-diameter portion is tightly engaged with the opening by further inserting the metal sleeve into the resin sleeve to a position where the upper end portion is expanding the large-diameter portion of the resin sleeve, the lower engagement end portion is expanding the small-diameter portion, and the projected ring disengages with the circular groove of the resin sleeve.

11. The method of claim 10, wherein the metal sleeve further comprises an intermediate portion between the lower engagement end portion and the upper end portion.

12. The method of claim 10, wherein the upper end portion of the metal sleeve is tapered.

13. The method of claim 12, wherein the tapered upper end portion gradually expands in diameter away from the lower engagement end portion.

14. The method of claim 10, wherein in the partially assembled position, the engagement end portion engages the step on the inner circumference of the resin sleeve while the projected ring portion is engaged with the circular groove.

15. An anticorrosion sleeve for a saddle valve having a water passage ring comprising:

a resin sleeve having a large-diameter portion and a small-diameter portion; and a metal sleeve to be tightly received in the resin sleeve so that the metal sleeve expands the resin sleeve in diameter when the metal sleeve is inserted into the resin sleeve, the metal sleeve comprising an engagement end portion, an intermediate portion, and a tapered end portion having an outer diameter that gradually decreases toward the intermediate portion, the tapered end portion being capable of expanding the large-diameter portion of the resin sleeve into engagement with a water passage ring of the saddle valve;

wherein the intermediate portion of the metal sleeve is passed through the large-diameter portion of the resin sleeve to be ready to expand the small-diameter portion of the resin sleeve in diameter before further pushing the metal sleeve into the resin sleeve, and wherein the tapered end portion of the metal sleeve is ready to be tightly engaged with the large-diameter portion in a manner such that the metal sleeve expands the large-diameter portion in diameter; and wherein the metal sleeve comprises a projected ring portion on a lower end of the outer circumference of the engagement end portion, wherein the resin sleeve comprises a circular groove on an upper end of the inner circumference of the small-diameter portion;

wherein the metal sleeve is connected to the resin sleeve with the projected ring portion engaged with the circular groove as a partially assembled position with the tapered end portion exposed from the resin sleeve;

wherein the metal sleeve and resin sleeve, connected in the partially assembled position, are insertable into an opening in a pipe.

* * * * *